A. FISCHER.
FLEXIBLE JOINT FOR THE TONE ARMS OF TALKING MACHINES.
APPLICATION FILED JUNE 29, 1911.
1,097,618.  Patented May 26, 1914.
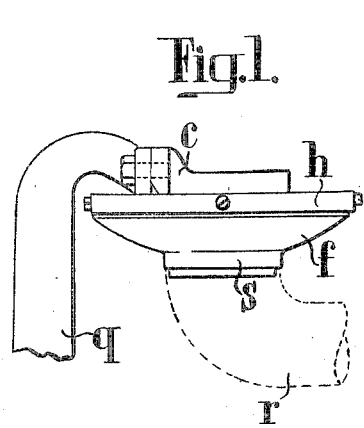
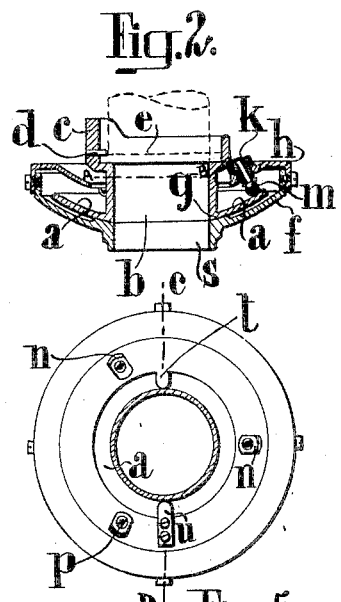
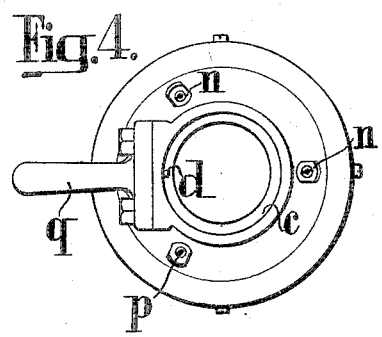
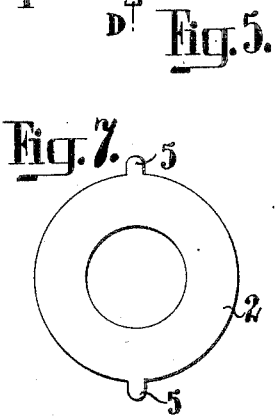
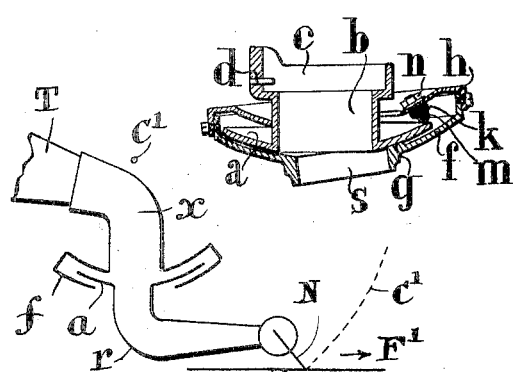
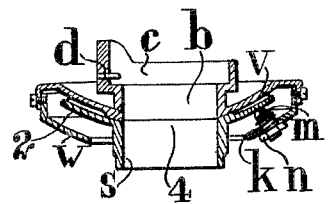

UNITED STATES PATENT OFFICE.

ALEX FISCHER, OF KENSINGTON, LONDON, ENGLAND.

FLEXIBLE JOINT FOR THE TONE-ARMS OF TALKING-MACHINES.

1,097,618. Specification of Letters Patent. Patented May 26, 1914.

Application filed June 29, 1911. Serial No. 636,004.

*To all whom it may concern:*

Be it known that I, ALEX FISCHER, a subject of the King of England, residing at 8 Maclise road, Kensington, London, England, have invented certain new and useful Improvements in Flexible Joints for the Tone-Arms of Talking-Machines; and I do hereby declare the following to be a full, clear, and exact description of the invention, such as will enable others skilled in the art to which it appertains to make and use the same.

This invention refers to flexible joints for the tone arms of talking machines and has for its object the removal of the tendency to bind, that in joints for which I obtained Letters Patent No. 879755 has been found to occur between the convex portion of the flange attached to the moving member and the concave portion of the flange attached to the fixed member.

The flexible joint made according to my present invention comprises as in the previous case, two members, a fixed member in connection with the trumpet and a movable member in connection with the tone arm, but in place of providing curved flanges with their center of curvature on the same side of the joint as the moving member, I provide a flange in connection with one of the members which flange is curved and has the center of curvature located on the same side of the joint as the fixed member the other member being provided with a bearing surface corresponding to and concentric with the aforesaid flange and being in addition provided with parts extending beyond and around the edge of the flange carrying means coming on the other side of the flange to keep the flange and the corresponding surface in contact.

In one way of carrying out my present invention, in place of providing a convex flange on the moving member coming between two flanges attached to the fixed member, I provide the fixed member with a convex flange such flange being convex at the outer and concave at the inner surface, the curvatures being both struck from the same center and I provide the moving member, that is the tone arm, with two flanges curved so as to correspond to the inner and outer surfaces of the aforesaid fixed member and connected together so as to form a species of cap. The moving member is thus supported by the two flanges attached to it and enabled to move in conformity with the convex flange of the fixed member.

I may either have the two flanges attached to the moving member coming directly into contact with the convex flange attached to the fixed member in a manner analogous to that described and shown in connection with Figure 3 of my aforesaid specification or I may employ balls coming between any of the bearing surfaces either resting directly upon such surfaces or working in grooves therein. Where it is desired to adjust the balls I provide screws coming at the back of the balls, which screws pass through the cap. I prefer that the directions in which the holes or grooves for the reception of the balls are drilled shall be radial with respect to the center of rotation of the joint.

In another way of carrying out my invention I provide the moving member with a flange and the fixed member with two flanges forming a species of cap. In this case also I arrange that the center of curvature is on the trumpet side of the joint, corresponding alterations being made in the rest of the construction.

In the case where I dispense with the grooves on the intermediate flanges and use balls merely touching this flange, or where I dispense with the use of ball bearings altogether, I may provide the moving member with lugs in order to prevent the rocking over motion of the sound box. And in order that my said invention may be better understood, I will proceed to describe the same with reference to the drawing accompanying this specification, in which:—

Fig. 1 shows side elevation of one form of my joint; Fig. 2 shows same in vertical longitudinal section; Fig. 3 shows similar view to Fig. 2 but with the moving member in its extreme position. Fig. 4 shows plan of Fig. 1. Fig. 5 shows plan of Fig. 2 with a portion cut by the line A B Fig. 2 in section. Fig. 6 shows sectional elevation similar to Fig. 2 of another form of my invention. Fig. 7 shows plan of a detail. Fig. 8 is a diagram of the essential features of the invention.

The same letters and numerals of reference are employed to denote the same parts in all the views.

*a* shows convex flange which is attached to the exit tube *b* provided at the top with a socket *c* forming the fixed member, and a pin *d* for retaining the flange *e* of the trumpet elbow in position.

*f* shows a flange similarly curved to the convex flange *a* and provided with a bearing surface *g* which works against the underside of the flange *a*. The flange *f* has attached thereto a ring like cap or cover *h* forming with the flange *f* the movable member. This cover *h* is made preferably of a similar curvature to the flanges *a* and *f*.

*k* are screw plugs provided with a concavity at the end in which balls *m* are mounted. These screws *k* screw through the cap *h* in such a manner that the ball *m* and the screw are radial to the center of the curvature of the top of the flange *a*, the fixed member.

*n* is a lock nut around the screws and *p* is a hole passing through the screw *k* to allow for lubrication when required. The balls *m* of which three are provided in the forms shown in the drawing work upon the top of the flange *a*, the fixed member, and are so adjusted that the bearing face *g* of the flange *f* moves against the underside of the flange *a* with the minimum amount of friction necessary for a sound tight joint. It should be observed that the curvature of all the working surfaces is struck from the same center and that such center is on the trumpet side of the joint.

*q* shows a bracket, see Figs. 1 and 4 to which is fixed the socket *c* thus holding the flange *a* stationary.

It will be seen that it is possible to move the flange *f* and with it the cap *h* forming the movable outer member in any direction with respect to the flange *a*, the fixed inner member, for example it may be given a rotary motion and a motion from side to side from any position.

*r* shows tone arm dotted at Fig. 1. This is attached to the opening *s* provided in the flange *f* and leading to the exit tube *b*. As the tone arm is attached to the opening *s* which is in one with the moving member it follows that the tone arm can move in any direction. Therefore when a sound box is on the end of the tone arm the sound box may have an up and down motion and a motion across the record, around the center of rotation of the tone arm.

In order to prevent the sound box from rocking over, that is to prevent the needle coming at the wrong angle with respect to the record I provide means for preventing the movable member moving from side to side. This will be seen at Fig. 5, where *t* shows a lug made with the cap *h*, and *u* shows a similar lug screwed to the cap *h* at the position of 180 degrees from the lug *t*. The lugs *t* and *u* project inwardly and come in contact with the side of the exit tube *b* of the fixed member thus preventing any side action along the line C D of Fig. 5.

Referring to Figs. 6 and 7 in this case in place of providing the fixed member with one convex flange I provide the fixed member with two (outer) convex flanges *v* and *w* and the movable member with an (inner) similarly formed single flange 2.

*v* shows one of the flanges attached to the exit tube *b*, and socket *c* and a pin *d* for retaining the flange of the trumpet elbow. The flange *v* has attached to it at some distance therefrom a ring like cap or cover *w*. The flanges *v* and *w* and the exit tube *b* and the socket *c* forming the fixed member are held by a bracket similar to the bracket *q* Fig. 1. The movable member is formed with the single flange 2. The flange 2 works against the bearing surface of the flange *v*. The flange 2 is provided with a tube 4 leading to the opening *s* for attachment to the tone arm. The balls *m* in this case are held in the screws *k* as before only they point upward instead of downward as previously, and the screws *k* screw into the ring-like cap or cover *w*, the balls coming on the under side of the flange 2, the movable member. The curvature of all the working faces is struck from the same center and such center is on the trumpet side of the joint as in the previous case.

In order to prevent the rocking over of the sound box the movable member that is the flange 2 is provided with two lugs 5 which come in contact with the sides of the fixed member thus preventing the rocking over.

I may make my invention in many forms still keeping to the general principle of a flexible joint for the tone arm of talking machines, provided with a fixed convex flange or flanges correspondingly curved movable flanges or flange the curvature of the flanges being struck from a point on the trumpet side of the joint.

It will be observed that the center of curvature of both the flange *a* and the bearing surface *g* is well above the joint, thus providing a relatively long radius. In this way the needle at the outer end of the tone arm is made to traverse a relatively flat arc which is inclined in the direction of the pull of the record on the needle. By thus causing the needle to rise at a relatively sharp angle in the direction of the pull of the record on the needle, a very easy movement is obtained which is not interfered with when the table wabbles in the usual way.

Fig. 8 is a diagram of the essential features of the invention and indicates the manner in which it operates. *f* indicates that part of the joint which is connected at *x* with the trumpet T. *a* indicates that part of the joint connected with the tone arm *r* which carries the needle N. C′ indicates the center of curvature of the parts $f$ and $a$ and $c'$ indicates an arc struck from the center $C'$ and passing through the point of the needle. The record or table is indicated at W, and the arrow F' indicates a force which tends to pull the needle outward from the center of the record. When the table wabbles the needle moves in the arc indicated at $c'$.

What I claim as my invention and desire to secure by Letters Patent in the United States of America is:—

1. A flexible joint for the tone arm and trumpet of a talking machine, comprising a fixed member connected with the trumpet and a movable member connected with the tone arm, one of said members having a curved flange and the other member having a bearing surface corresponding to and concentric with said flange, and means acting on said flange for keeping it and the bearing surface in contact with each other, the center of curvature of said curved flange and bearing surface being on the same side of the joint as the fixed member and located well outside the joint whereby the needle on the outer end of the tone arm is made to traverse a relatively flat arc inclined in the direction of the pull of the record on the needle.

2. A flexible joint for the tone arm and trumpet of a talking machine, comprising a fixed member connected with the trumpet and a movable member connected with the tone arm, one of said members having a curved flange and the other member having a bearing surface corresponding to and concentric with said flange, means acting on said flange for keeping it and the bearing surface in contact with each other, the center of curvature of said flange and bearing surface being located well above said joint whereby the needle on the outer end of the tone arm will rise at a relatively sharp angle in the direction of the pull of the record on the needle.

3. A flexible joint for the tone arm and trumpet of a talking machine, comprising a fixed member connected with the trumpet and provided with a concavo convex flange, a movable member connected with the tone arm having a bearing surface corresponding to and in contact with said flange, and means supported by the movable member for holding the bearing surface and the flange in contact with each other, the center of curvature of said flange and bearing surface being located well outside of and above the joint whereby the needle on the outer end of the tone arm is made to rise at a relatively sharp angle in the direction of the pull of the record on the needle.

4. A flexible joint for the tone arm and trumpet of a talking machine, comprising a fixed member connected with the trumpet and provided with a concavo convex flange, a movable member connected with the tone arm having a bearing surface corresponding to and in contact with the flange, a cap supported by the movable member, screw plugs carried by this cap, balls at the outer ends of said screw plugs bearing on the concavo convex flange and holding it in contact with said bearing surface, the center of curvature of said flange and said bearing surface being located outside of and well above the joint whereby the needle on the outer end of the tone arm is made to traverse a relatively flat arc of large radius inclined in the direction of the pull of the record on the needle.

In testimony whereof, I affix my signature, in presence of two witnesses.

ALEX FISCHER.

Witnesses:
A. BROWNE,
A. E. VIDAL.